2,799,759
PROCESS FOR THE WELDING OF A PLASTIC MATERIAL

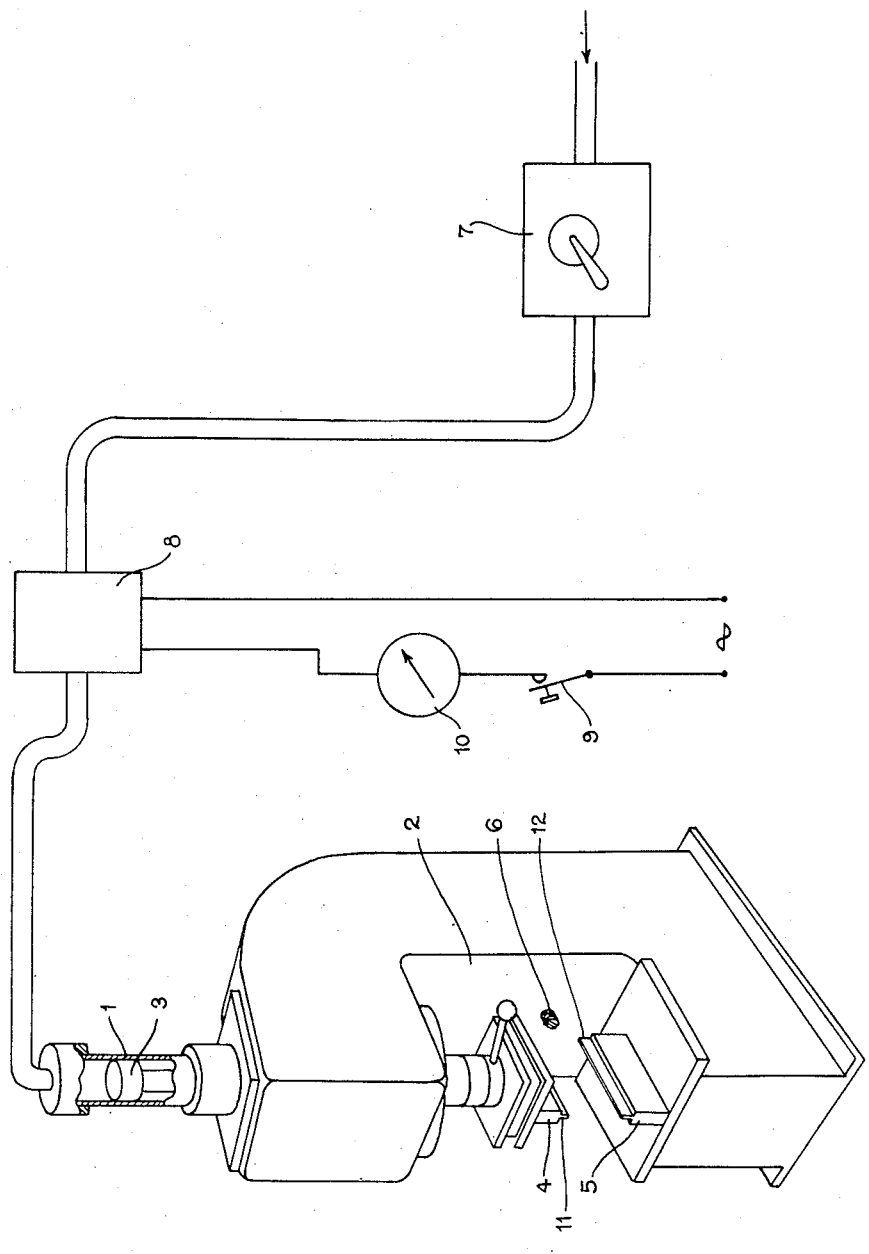

Joseph Edouard Marie Blond and Jean Roger Louis Nasica, Paris, France, assignors to Societe de l'Electronique Française, Asnieres, France, a body corporate of France Application February 18, 1955, Serial No. 489,158

Claims priority, application France December 3, 1954

2 Claims. (Cl. 219—10.53)

The present invention relates to a process for the welding of plastics and particularly to the preparation of definite quantities of liquid or pasty substances from a tube made of a plastic material which is filled up with the selected substance. The tube is crushed at regular intervals to force out the liquid or paste on either side of the zone of crushing, the tube being welded in said zone by means of the electrodes of a high frequency electronic welding machine, so as to obtain a succession of small "pouches," which are subsequently separated from each other.

Several precautionary measures are to be taken to obtain accurate welds. First, as the welds are usually made by applying to the electrodes a voltage ranging about 400 volts with a frequency ranging about 27 megacycles, it is necessary to prevent the formation of brush discharges and the deterioration of both the material to be welded and the electrodes caused by an arc discharge taking place at the moment when the electrodes are brought close to the material to be welded. This is accomplished by stopping the H. F. generator between the successive welding steps and applying the voltage to the electrodes only when they are already strongly applied upon the material to be welded. However, this procedure involves individual handling, loss of time, detrimental jerks on the vacuum tubes of the generator, and excessive wear on the contacts.

In addition, as the welding takes some time, the heat given off by the dielectric losses is propagated through the zone of plastic material clasped between the electrodes and creates a zone of smaller resistance at the edge of the clasped zone in which bursting may occur, owing to the pressure of the liquid in the tube. In order to prevent this danger, it is necessary to dispose guard plates on both sides of the electrode, each guard plate having a thickness of a few millimeters and holding the clasped material in position in the entire highly heated zone. Nevertheless, as the welding does not take place opposite these plates, the corresponding volume of the tube is lost so that the amount of substance which can be introduced in each pouch is unnecessarily reduced and the completed pouches are not entirely filled up and do not show a pleasing appearance.

The process of the present invention overcomes all of the aforementioned disadvantages as the high frequency voltage is kept permanently applied on the electrodes, without any breaking between the successive welds. Use is made of a generator having a frequency ranging about 100 megacycles or even more and supplying between the welding electrodes a voltage ranging from 200 to 300 volts.

Due to the use of a high frequency, the resonance curve is much more acute, so that the generator is tuned and supplies its full power only when the electrodes are strongly applied upon the plastic material to be welded. This fact, in addition to the use of a substantially lower voltage, prevents the risk of brush discharges and of sparking while the electrodes are brought nearer, without requiring the breaking of the voltage between the successive weld. In addition, the amount of heat given off during each unit of time in the mass of material subjected to the electric high frequency field is much greater than with the known processes, on account of the increase of the frequency. This allows a reduction of the welding time with the additional advantage that, as the heat given off has not had time to be transmitted to the parts of the tube which are not clasped between the electrodes proper, all danger of a bursting of the tube is avoided. The guard-plates usually utilized on both sides of the electrodes can be eliminated so that the width of the clasped portion of the tube becomes equal to the width of the weld.

Finally, since the electrodes are kept charged in the time interval between welds and while said electrodes are brought close to the matter to be welded, a gradual heating of the matter occurs, even before the pressure is applied, thus further increasing the speed of the welding operation once the electrodes are tightened.

By way of example, a form of embodiment of the electronic welding machine designed to put in practice the process according to the invention is described hereinafter and diagrammatically illustrated in the annexed drawing.

The process according to the invention speeds up welding operations to such an extent that the use of mechanical or hydraulic devices to apply the electrodes upon the piece to be welded becomes inadequate, owing to their slowness of handling.

Therefore, the welding-machine according to the invention includes a compressed-air jack constituted by a cylinder 1 mounted in the frame 2, the piston 3 of said cylinder being provided with a stem supporting the upper movable electrode 4. The gap between the electrode 4 and the stationary lower counter-electrode 5 is adjusted by means of an abutment 6, preferably controlled by a micrometer screw so as to obtain, at the time of the welding, about a 50% reduction in thickness of the welded material. The electrodes are connected in a conventional manner with the H. F. generator (not shown). The cylinder 1 is fed with compressed air through a hand actuated relief valve 7 allowing the pressure to be kept at a value constant and independent from the compressed air supply, the exhaust being controlled by an electro shutter valve 8. The control-circuit of the valve 8 includes an interlocking push-button switch 9 and a timer 10, set for the time required for the welding. At the end of this period, the stoppage of the compressed air supply and the release of the cylinder 1 is automatically effected, the piston of the cylinder being brought back to its upper position by a return spring to separate the welding electrodes. Since there is no danger of brush discharges and of sparking, the upper electrode 4 and the opposite stationary electrode 5 can be provided with longitudinally extending median ribs, 11, 12, which bring about an additional reduction in thickness of the welded material in the middle of the weld. This facilitates the subsequent parting of the pouches from each other, simply by tearing the material along the line of reduced thickness.

The welding-machine according to the invention can easily be incorporated in a line for an entirely automatic manufacture, by combining the working of the electroshutter valve with a device feeding the tube made of a plastic material to be welded. This device is controlled by the timer 10 actuating the electro-shutter valve, the resetting of the timer allowing the automatic feeding.

What I claim is:

1. In an electronic welding machine for the production of plastic containers each containing a desired amount of pasty and liquid substances by filling a tube made of thermoplastic material with said substance and welding the walls of said tube together successively at points spaced apart at distances equal to the length of the individual containers, a permanently operating H. F. generator having a voltage of about 200 to 300 volts and a frequency of about 100 megacycles, a movable electrode and a stationary counterelectrode permanently connected with said generator, means for pressing the tube filled with said substance between said electrodes whereby the generator is tuned and its full power supplied only when the electrodes are strongly applied upon said tube, said electrodes being formed by metallic conductive members having a width exactly equal to the width of the sealings to be made, pneumatic means for applying the movable electrode upon the tube to be sealed, means to feed the jack with compressed air, an electrically controlled valve controlling the feeding of said jack with compressed air, and a timer mounted in the control circuit of said valve and comprising means to be adjusted according to the time required for the welding.

2. In a method for the production of plastic containers each containing a desired amount of pasty and liquid substances, comprising the filling of a tube made of thermoplastic material with said substance, pressing the tube walls together at points spaced apart at distances equal to the length of the individual containers between high frequency welding electrodes arranged transversely to the tube, the steps of continuously maintaining on said electrodes a voltage of about 200 to 300 volts and a frequency of about 100 megacycles and of controlling the energy fed to the material to be welded by means of the pressure responsive capacity formed of the electrodes and the plastic material when resonance condition is established by strongly applying the electrodes upon the plastic material.

References Cited in the file of this patent

UNITED STATES PATENTS

| | | |
|---|---|---|
| 2,530,400 | Rado | Nov. 21, 1950 |
| 2,638,963 | Frederick et al. | May 19, 1953 |
| 2,686,556 | Gerber et al. | Aug. 17, 1954 |
| 2,691,613 | Baer | Oct. 12, 1954 |

FOREIGN PATENTS

| | | |
|---|---|---|
| 672,258 | Great Britain | May 21, 1952 |